United States Patent [19]
Tereshchenko et al.

[11] Patent Number: 5,832,662
[45] Date of Patent: Nov. 10, 1998

[54] METHOD FOR GRAFTING ROOTSTOCK USING IMPROVED GRAFTING FILM

[75] Inventors: Alexander P. Tereshchenko; Jeffrey Duarte, both of Hughson, Calif.

[73] Assignee: Duarte Nursery Inc., Hughson, Calif.

[21] Appl. No.: 823,057

[22] Filed: Mar. 21, 1997

[51] Int. Cl.[6] ...................................................... A01G 1/06
[52] U.S. Cl. ............................................................ 47/6
[58] Field of Search .............................. 47/6, 7, 40.5, 58, 47/63, DIG. 3; 427/4; 428/34.9, 349, 424.8, 425.1, 913

[56] References Cited

U.S. PATENT DOCUMENTS

| | | | |
|---|---|---|---|
| 3,214,338 | 10/1965 | Erlich | 47/6 |
| 3,622,439 | 11/1971 | Manne | 428/424.8 |
| 4,383,390 | 5/1983 | Lagerstedt | 47/6 |
| 4,783,342 | 11/1988 | Polovina | 472/4 |
| 5,272,016 | 12/1993 | Ralph | 428/34.9 |
| 5,538,790 | 7/1996 | Avredson et al. | 428/34.9 |

*Primary Examiner*—Michael J. Carone
*Assistant Examiner*—Elizabeth Shaw
*Attorney, Agent, or Firm*—Wilson Sonsini Goodrich & Rosati

[57] ABSTRACT

A grafting film is provided which is formed of a film of a polyalkylene polymer having a self-adhesive property and an elastic memory which causes the film when stretched around a scion and rootstock graft union to gradually contract around the graft union and apply an increasing amount of pressure circumferentially around the graft union. The film also has oxygen and $CO_2$ permeability properties which cause a gas volume isolated by the film adjacent the graft union to have a higher $CO_2$ concentration and a lower oxygen concentration relative to the ambient environment around the plant. The film preferably has at least 12% oxygen permeability and less than 3% $CO_2$ retention. The film is preferably less than about 60 $\mu$m thick and more preferably less than about 50 $\mu$m thick.

44 Claims, 13 Drawing Sheets

METHOD FOR GRAFTING ROOTSTOCK USING IMPROVED GRAFTING FILM

FIELD OF THE INVENTION

The present invention relates to a film for grafting a scion to a rootstock as well as methods and compositions in which the grafting film is used.

BACKGROUND OF THE INVENTION

Grafting is a method of asexual plant reproduction involving the joining of a scion to a rootstock. Once grafted, water and nutrients are transported from the rootstock to the scion to support growth of the scion.

A variety of different methods and tools have been developed for cutting the scion and rootstock to form complementary ends which are united during grafting. Examples of these methods and tools are described in U.S. Pat. Nos. 5,524,386; 5,414,958; 5,209,011; 4,769,944; 4,654,999; 4,467,559; 4,392,304; 4,098,020; 4,014,132; and 3,969,843.

Once cut, the complementary ends of the scion and rootstock are brought together to form a graft union. Callous tissue forms at the graft union as part of the normal healing process of the plant and serves as a conduit for water and nutrients between the scion and rootstock. The extent of the callous tissue formed at the graft union between the scion and rootstock, as well as the cell density of the callous tissue, is critical to the plant's ability to transmit water and nutrients from the rootstock to the scion and ultimately limits the size and rate at which the scion grows. As described in U.S. Pat. No. 4,383,390, callous tissue formation is influenced by a variety of factors including temperature, light, pressure, moisture and chemical growth regulators.

A variety of different methods and tools have been developed for binding the cut ends of the scion and rootstock and for fostering callous tissue formation. These methods and tools generally involve a binding agent (e.g., staple, rubber or wax grafting bands) which brings the cut scion and rootstock ends into close contact. These methods and tools also generally include the use of a sealing agent (e.g., wax) which isolates the graft union from external elements and protects the graft union from dehydration, insects, and the environment. For example, U.S. Pat. Nos. 5,133,335 and 5,099,600 teach a method and apparatus in which a graft union is wrapped in budding strips and then covered with paraffin wax. U.S. Pat. No. 5,529,827 teaches the use of a self-adhesive film formed of a composite of paraffin wax, polyisobutylene and polyethylene. The self-adhesive film is covered by minute particles which are used to alter the self-adhesiveness of the film. U.S. Pat. No. 4,383,390 teaches a method for heating a graft union in order to foster callous tissue formation.

Several methods have been developed which use a plastic bag, waxed paper or polyvinyl chloride grafting tape as a binding element. These elements have been found to restrict scion growth and require removal after grafting. The need to remove these binding elements from individual plants is highly disadvantageous for large scale grafting operations, particularly the production of rootstock, such as grapes, which can involve the grafting of multiple millions of plants in a single season. A need therefore also exists for a method which does not require the plants to be manipulated after grafting.

In any grafting method, it is important that the graft union formed between the scion and rootstock produce callous tissue which is capable of supporting strong and rapid scion growth. In this regard, it is important that callous tissue form throughout the graft union. The grafting method should also be simple and inexpensive to practice. In addition, the grafting method should enable a large number of grafts to be produced per unit time and is preferably suitable for automation. The method should be reliable and produce a high percentage of viable plants. A need currently exists for a grafting method and tool which provides the above-described advantages.

SUMMARY OF THE INVENTION

The present invention relates to a grafting film formed of a film of a polyalkylene polymer having a self-adhesive property and an elastic memory which causes the film when stretched around a scion and rootstock graft union to gradually contract around the graft union and apply an increasing amount of pressure circumferentially around the graft union. The film also has oxygen and $CO_2$ permeability properties which cause a gas volume isolated by the film adjacent the graft union to have a higher $CO_2$ concentration and a lower oxygen concentration relative to the ambient environment around the plant. The film preferably has at least 12% oxygen permeability and less than 3% $CO_2$ retention. The film is preferably less than about 60 $\mu$m thick and more preferably less than about 50 $\mu$m thick.

In one embodiment, the polyalkylene polymer film is formed of olefin subunits having between 1 and 6 carbons. Examples of these olefin subunits include, but are not limited to ethylene, propylene, isopropylene, butylene and isobutylene. In one embodiment, the polyalkylene polymer film is either polyethylene, polyisopropylene, polybutylene or polyisobutylene.

The present invention also relates to a method for forming a plant by grafting a scion to a rootstock. According to the method, an end of the scion and an end of the rootstock to be grafted are cut to form complementary ends. These ends are then joined together to form a graft union. A grafting film according to the present invention is then wrapped around the graft union.

The present invention also relates to a plant formed by grafting a scion to a rootstock in which the scion and rootstock are bound together using a grafting film of the present invention.

BRIEF DESCRIPTION OF THE DRAWINGS

FIGS. 1–3 illustrate steps in a method for grafting a scion to a rootstock using the grafting film of the present invention.

FIG. 2 illustrates the scion and rootstock being wrapping by grafting film.

FIG. 3 illustrates the grafting film being wrapped around the top of the scion.

FIG. 9 illustrates a bud developing beneath the grafting film.

FIG. 10 illustrates the tip of the bud piercing through the grafting film.

FIG. 11 illustrates the growth of the bud through the grafting film.

FIGS. 12A and 12B illustrate a preferred method for growing root buds on grafted plants.

FIG. 12A illustrates the step of placing grafted plants in water for a first period of time.

FIG. 12B illustrates the step of removing the grafted plants from the water for a second period of time.

DETAILED DESCRIPTION

Figure 1A:
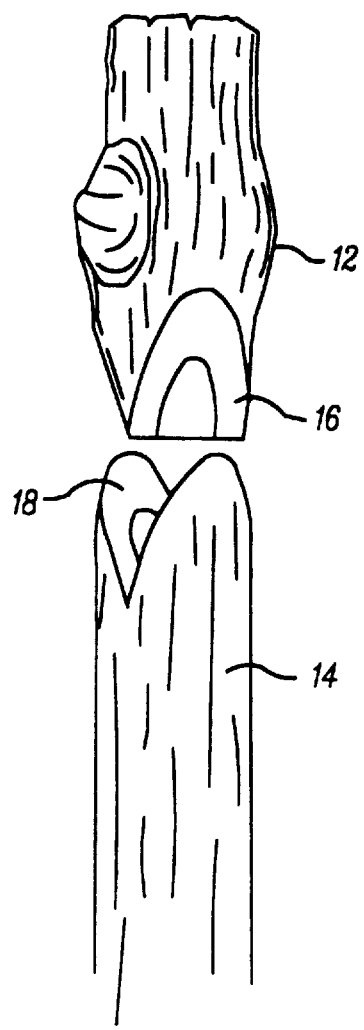
FIG. 1A illustrates a scion and rootstock being cut such that the ends of the scion and rootstock are complementary.

The present invention relates to a grafting film, a method for using the grafting film to rapidly and efficiently graft a scion to a rootstock, and the grafted plant that is produced using the grafting film and method. The grafting film is used in the method of the present invention to form plants having enhanced callous tissue formation at the graft union. The enhanced callous tissue formed using the grafting film and by the method supports excellent fluid and nutrient transport from the rootstock to the scion. In particular, the callous tissue that is formed may be characterized by a higher cell density and a more highly ordered organization of cells which results in a more efficient physiological link between the scion and the rootstock. As a result, plants grafted using the grafting film and according to the method exhibit more rapid and enhanced scion development. In addition, the grafting film and method produce a higher percentage of viable plants as compared to previous methods.

The grafting film and method of the present invention may be used with all horticulture crops. The grafting film and method are particularly well suited for grafts involving members of the citrus and prunus families of plants, and, in particular, grapevines.

The cambium layer in grapevines (as well as other plant varieties whose cambium layer is not perennial) is developed in a single year and does not grow after the first year. As a result, the callous tissue that is developed between the scion and rootstock during grafting does not improve after the first year. It is therefore important to the viability and vigor of a grafted plant that the callous tissue formed during the grafting process form substantially circumferentially around the grafted plant at the graft union. It is also important that the callous tissue be formed of densely packed cells. This type of strong callous tissue growth is provided by the grafting film and method of the present invention.

The grafting film of the present invention has several physical properties which make the grafting film particularly well suited for inducing strong callous tissue growth. Callous tissue formation has been found to be enhanced by the presence of a slightly higher $CO_2$ concentration and slightly lower oxygen concentration than the ambient environment. One property of the grafting film is its gas permeability which supports the formation of a gas layer under the grafting film adjacent the plant which has a slightly higher $CO_2$ concentration and slightly lower oxygen concentration than the ambient environment. More specifically, the grafting film is permeable to oxygen and $CO_2$ and preferably has an oxygen permeability of at least 12% and $CO_2$ retention of less than 3%.

The grafting film also assists the scion to retain water. As a result, the relative humidity of the gas layer under the film adjacent the plant is maintained at a level greater than 95%. The ability of the grafting film to retain water prevents the scion from dehydrating and further facilitates the growth of callous tissue.

The grafting film has a self-adhesive character which enables the film to be wrapped around the scion without unraveling. This self-adhesive character is an important property since it is critical for the grafting film to remain wrapped around the graft union as the plant matures.

The grafting film is also elastic which enables the film to be stretched around a graft union. The elastic nature of the film also enables the film to expand as the scion grows.

The grafting film also possesses elastic memory which causes the film to gradually contract around the graft union after being stretched. As the grafting film contracts, the film applies pressure circumferentially around the graft union. The pressure applied by the film is not immediate and gradually increases over the course of a few minutes. This gradual increase in pressure gives the scion and rootstock time to move relative to each other to a position where there any gap between the scion and rootstock is minimized. By contrast to the grafting film, rubber grafting strips apply an immediate pressure to the scion and rootstock which can prevent the scion and rootstock from settling into an optimal position relative to each other.

The elastic memory of the grafting film continues to apply pressure as the callous tissue grows. The cells in the callous tissue formed under this pressure are more densely packed and more highly organized. As a result, the callous tissue that is formed acts as a more efficient physiological conduit between the scion and rootstock as compared to less dense callous tissue.

The grafting film is preferably at least 50% light transmissive and is more preferably at least 95% light transmissive (transparent). Light has been found to be absorbed by chlorophyl in the callous which stimulates callous differentiation. The light transmissive nature of the grafting film allows light to reach the chlorophyl and be absorbed.

It has also been found that callous tissue formation is stimulated when certain wavelengths of light are blocked by the film. Accordingly, in one embodiment the film is colored (i.e., it reflects selected wavelengths of light). In a preferred embodiment, the film appears to have a light blue color.

The grafting film is also preferably thermally stable such that it does not decompose in direct sunlight. In one embodiment, the film is stable to a temperature of at least 300° C. The thermal stability of the grafting film enables the film to be exposed to direct sunlight without decomposing or disassociating from the plant.

Unlike the grafting film of this invention, wax and paraffin based films have a low melting point which cause these films to decompose in direct sunlight. If the grafting film decomposes before the callous tissue is fully formed, the pressure being applied to the graft union is lost and less dense callous tissue is formed. In addition, cracks in the film due to film decomposition expose the graft union to the environment and allow water trapped in the scion to escape. Melted wax or paraffin can also seep into the graft union between the ends of the scion and rootstock and prevent the formation of callous tissue interconnecting the two. Under the sun's rays, hot wax can also burn scion and rootstock tissue at the graft union.

In order to produce a grafting film with the above properties, the grafting film is preferably formed of a single polyalkylene polymer that is preferably formed of one or more polymers having olefin subunits between 2 and 6 carbons in length. The polyalkylene polymer is preferably formed from polyethylene, polypropylene, polybutylene, polyisobutylene, or a mixture thereof. The polyalkylene polymer preferably has a specific gravity between about 0.91 and 0.97.

The grafting film should be sufficiently thin that it does not impede scion growth. Initially, the bud is covered by the grafting film which serves to protect the grafting film from infection by different microorganisms as well as to dehydration. However, as the bud starts to grow, the grafting film should be sufficiently thin to allow the scion bud to expand beneath the film and ultimately pierce through the film. Once the bud pierces through the grafting film, the bud should be able to continue to grow unimpeded by the grafting film, stretching and pushing the grafting film aside as necessary. Meanwhile, a portion of the bud adjacent the scion should remain protected by the film. This enables the film to protect the scion and bud while avoiding the need to later physically remove the grafting film from the plant.

The grafting film preferably has a thickness of less than about 60 $\mu$m, more preferably less than about 50 $\mu$m and is preferably between about 40–60 $\mu$m thick, more preferably between about 40–50 $\mu$m thick. At these thicknesses, the grafting film is sufficiently thin to allow a bud growing on the scion to pierce through the grafting film.

Figure 1B:
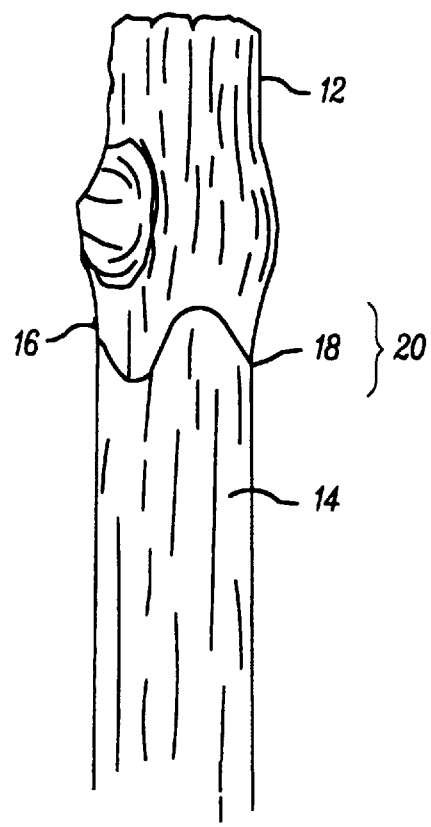
FIG. 1B illustrates the scion and rootstock being brought into contact with each other such that the complementary ends of the scion and rootstock receive each other to form a graft union.
Figure 2:
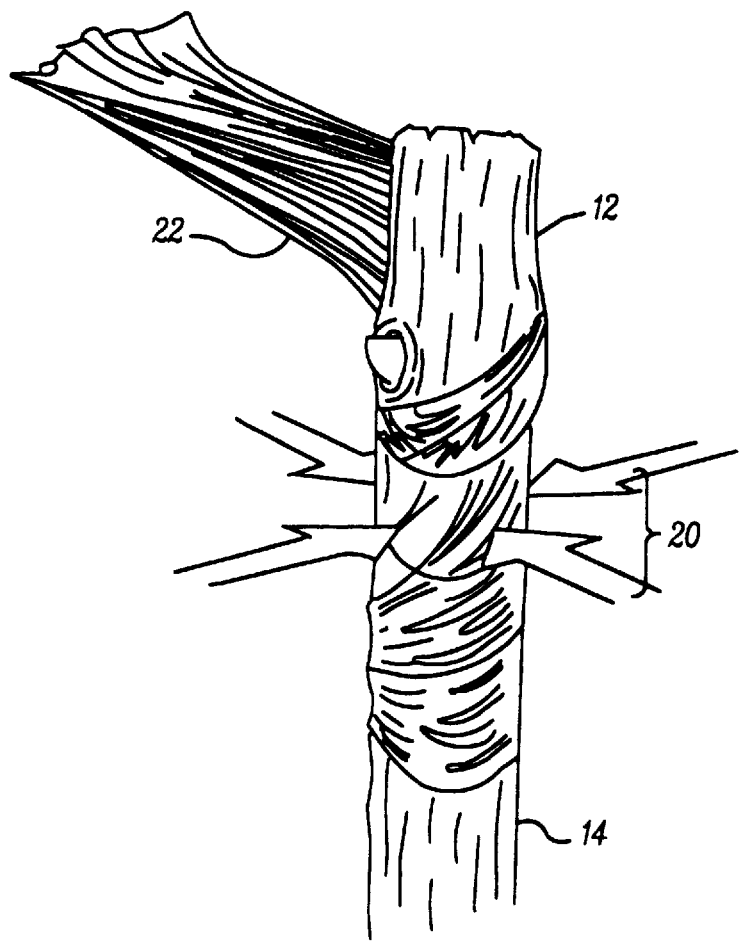
Figure 3:
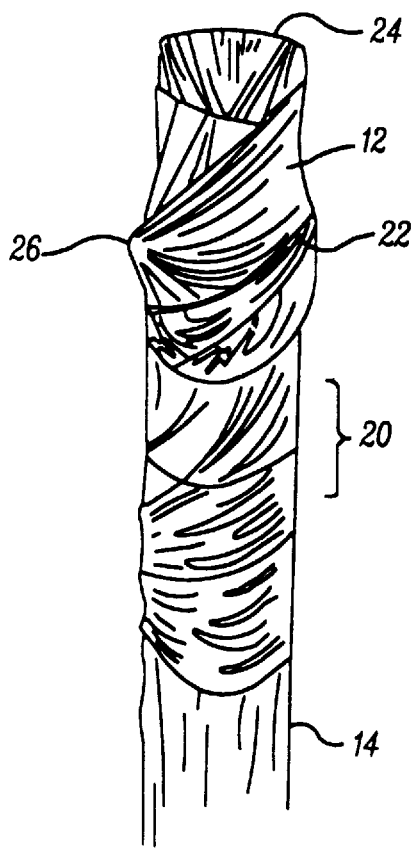

FIGS. 1–3 illustrate steps in a method for grafting a scion to a rootstock using the grafting film of the present invention. As illustrated in FIG. 1A, a scion 12 and rootstock 14 are cut such that the ends 16, 18 of the scion 12 and rootstock 14 are complementary. As illustrated in FIG. 1B, the scion 12 and rootstock 14 are brought into contact with each other such that the complementary ends 16, 18 receive each other to form a graft union 20.

Although one cutting pattern is illustrated in FIGS. 1A and 1B, it should be understood that the grafting film and method may be used with any method for cutting complementary ends on the scion and rootstock. Rather, this invention relates to an improvement in the way in which any scion and rootstock are bound together using the grafting film of the present invention to induce enhanced callous tissue formation.

FIG. 2 illustrates a scion 12 and rootstock 14 in the process of being wrapping by grafting film 22. As illustrated in FIG. 2 by the arrows, the grafting film 22 applies pressure around the circumference of the graft union 22. This forces the ends 16, 18 of the scion 12 and rootstock 14 into contact with each other.

FIG. 3 illustrates the grafting film 22 being wrapped around the top 24 of the scion 12. It is noted that the grafting film 22 is preferably wrapped over the entire scion in order to protect the scion 12 from infection, insects, changes in temperature and other factors which can harm the scion. By wrapping the entire scion 12, tender buds 26 that are later produced by the scion are also protected.

Figure 4A:
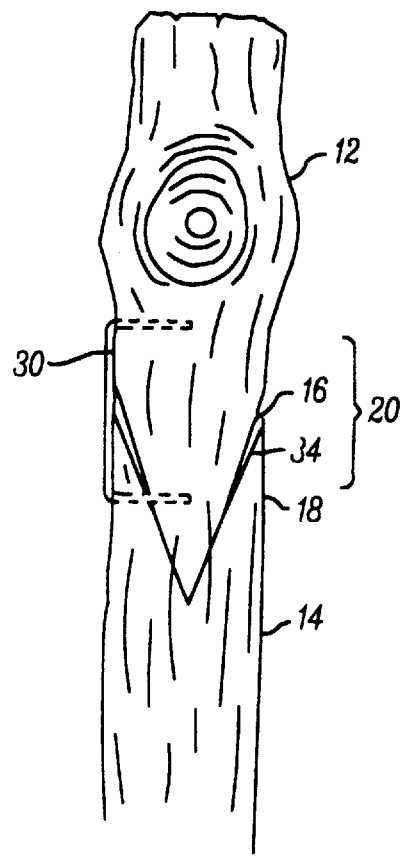
FIG. 4A illustrates a grafting union bound using a staple.
Figure 4B:
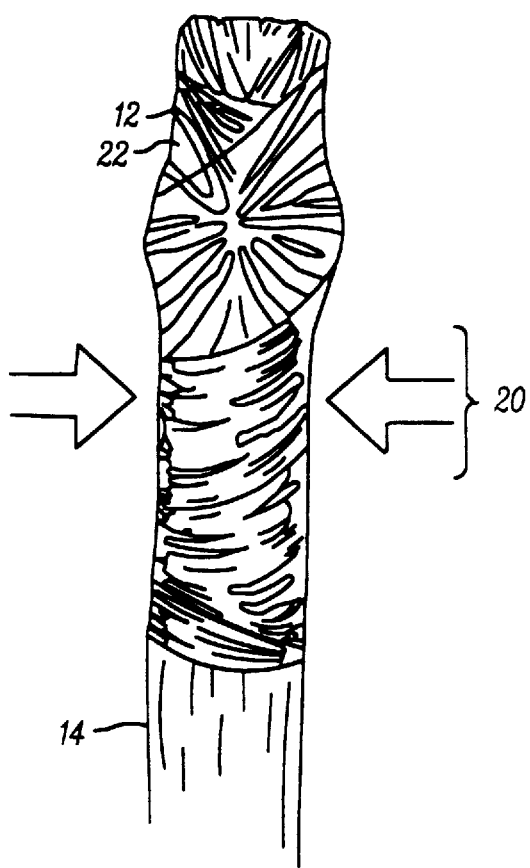
FIG. 4B illustrates a graft union bound using grafting film of the present invention.

FIGS. 4A and 4B compare the graft union formed using a staple 30 (FIG. 4A) and grafting film 22 (FIG. 4B). As illustrated in FIG. 4A, a staple 30 is introduced into the body of the plant which forces one side 32 of the rootstock end 18 into contact with the scion end 16. However, a gap 34 exists on the side 36 of the rootstock end 18 opposite the staple 30. This gap 34 exposes the graft union 20 to dehydration. Callous formation (not shown) adjacent the gap 34 is impeded by the existence of the gap 34, both due to dehydration and the lack of contact between the scion and rootstock. The use of a staple is also disadvantageous because it involves the introduction of a foreign object into the body of the plant.

By contrast to FIG. 4A, the graft union 20 formed through the use of grafting film 22 in FIG. 4B does not include the gap 34 between the scion end 16 and rootstock end 18 illustrated in FIG. 4A. As will be described below, denser callous tissue is formed using the grafting film than a staple. In addition, callous tissue is formed over a greater percentage of the area between the scion and rootstock ends when the grafting film of the present invention is used.

Figure 5A:
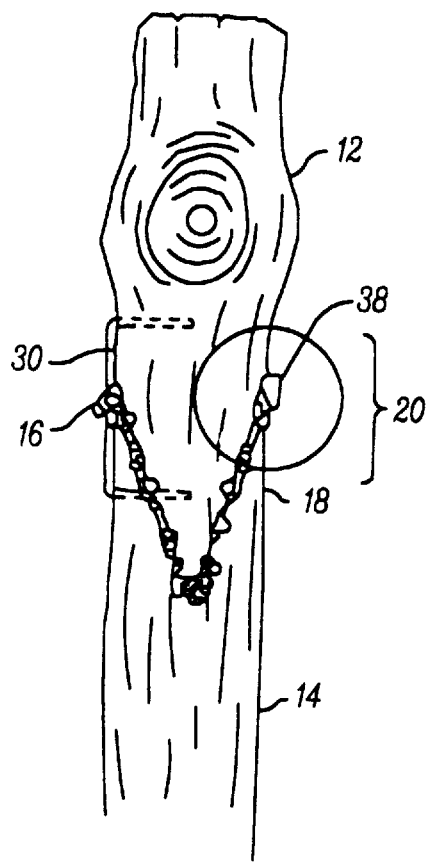
FIG. 5A illustrate the amount of callous tissue formed by the graft illustrated in FIG. 4A.
Figure 5B:
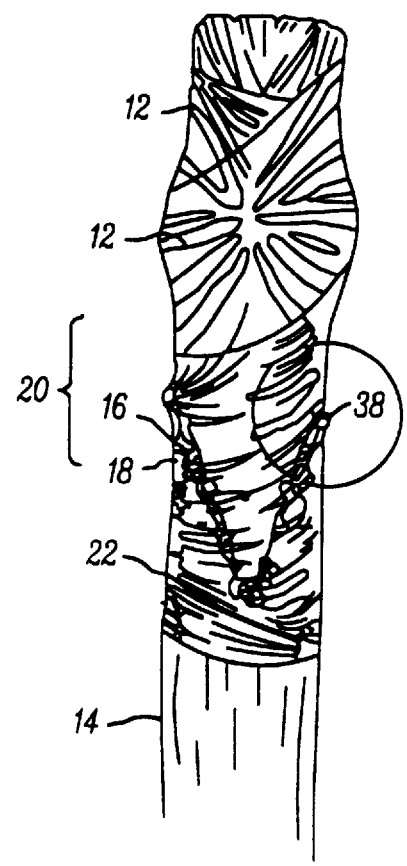
FIG. 5B illustrate the amount of callous tissue formed by the graft illustrated in FIG. 4B.

FIGS. 5A and 5B illustrate the different amounts of callous tissue 38 formed by the grafts illustrated in FIGS. 4A and 4B. As illustrated in FIG. 5A, callous tissue 38 is not formed throughout the graft union 20 between the scion 12 and rootstock 14. By contrast, as illustrated in FIG. 5B, callous tissue 38 is formed over more of the area between the scion 12 and rootstock 14 when the grafting film 22 is used. In a preferred embodiment, callous tissue is formed around the circumference of the rootstock when grafting film is used.

Figure 6A:
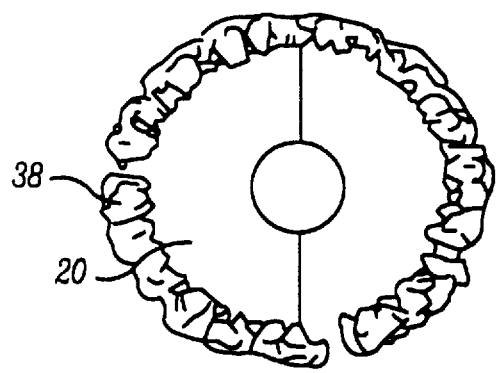
FIG. 6A illustrates a cross-section of the graft union illustrated in FIG. 4A which shows the amount of callous tissue formed by the graft.
Figure 6B:
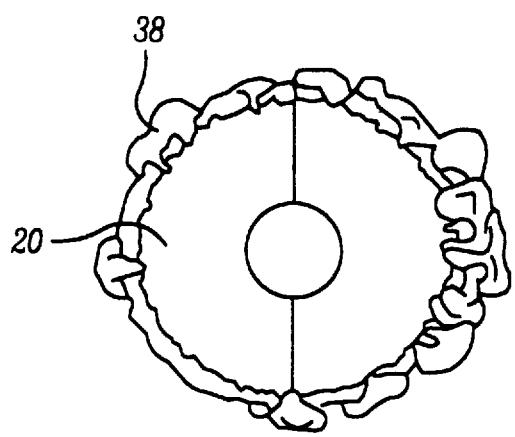
FIG. 6B illustrates a cross-section of the graft union illustrated in FIG. 4B which shows the amount of callous tissue formed by the graft.

FIGS. 6A and 6B illustrate a cross-section of the graft union 20 which shows the different amount of callous tissue 38 formed by the grafts illustrated in FIGS. 4A and 4B. As illustrated in FIGS. 6A and 6B, the concentration of callous tissue 38 formed is greater when grafting film is used to bind the scion and rootstock.

Figure 7B:
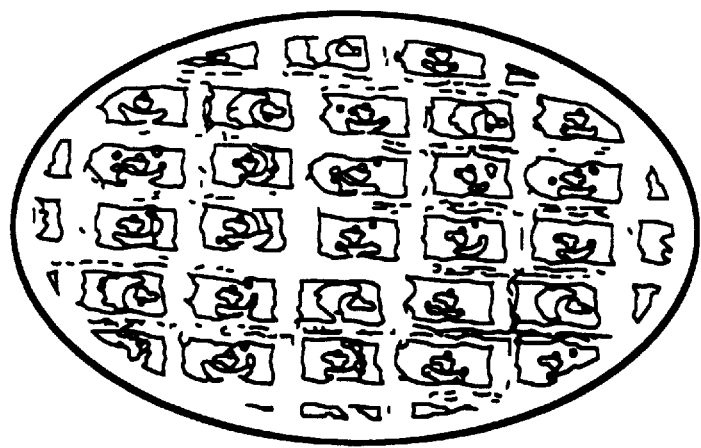
FIG. 7B illustrates the cell density of callous tissue formed by the graft illustrated in FIG. 4B.
Figure 7A:
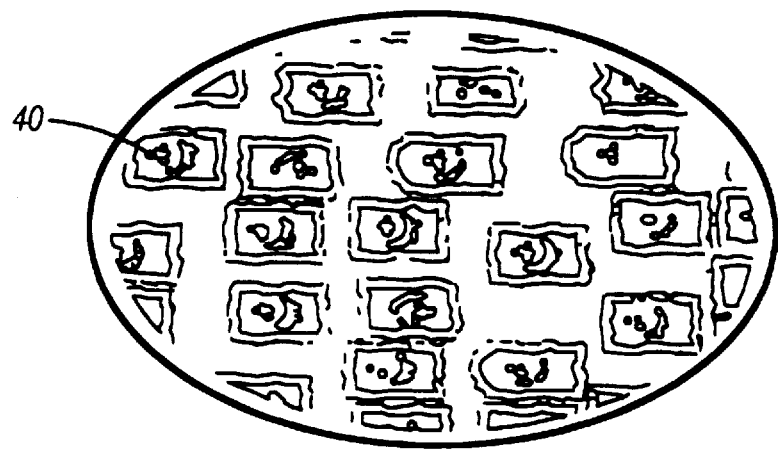
FIG. 7A illustrates the cell density of callous tissue formed by the graft illustrated in FIG. 4A.

FIGS. 7A and 7B illustrate the density of the cells 40 of callous tissue 38 formed by the grafts illustrated in FIGS. 4A and 4B. As illustrated in FIGS. 7A and 7B, the density of cells in the callous tissue 38 is greater when grafting film is used to bind the scion and rootstock. In addition, the cells that are formed are more highly organized relative to each other. These to factors make the callous tissue more efficient for transporting nutrients.

Figure 8:
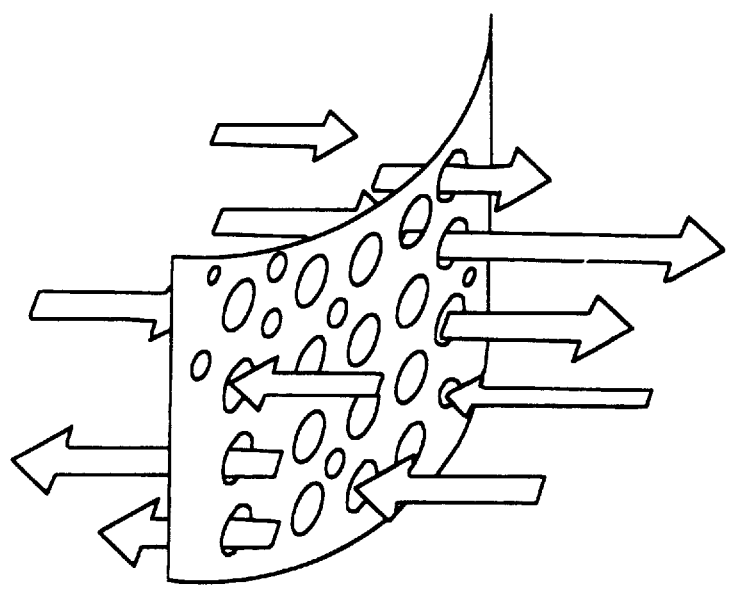
FIG. 8 illustrates the functioning of the grafting film adjacent the graft union for controlling the transfer of water, $CO_2$ and oxygen.

FIG. 8 illustrates the functioning of the grafting film 22 adjacent the graft union 20 as a water, $CO_2$ and oxygen transfer medium. The grafting film preferably has low level $CO_2$ retention, preferably less than about 3% $CO_2$ retention. The grafting film also preferably has a high degree of oxygen permeability, preferably at least 12%. As a result, the local environment adjacent the graft union has a slightly higher concentration of $CO_2$ and a slightly lower concentration of oxygen than the surrounding atmosphere, preferably 16% of $O_2$ and 2% of $CO_2$. This slightly higher $CO_2$ concentration and lower oxygen concentration is believed to further facilitate the growth of callous tissue.

As also illustrated by FIG. 8, the grafting film assists the graft to retain water, thereby reducing the risk of dehydration at the graft union which can also impede the growth of callous tissue.

Figure 9:
FIGS. 9–11 illustrate the emergence of a bud formed by the graft through the grafting film.
Figure 10:
Figure 11:
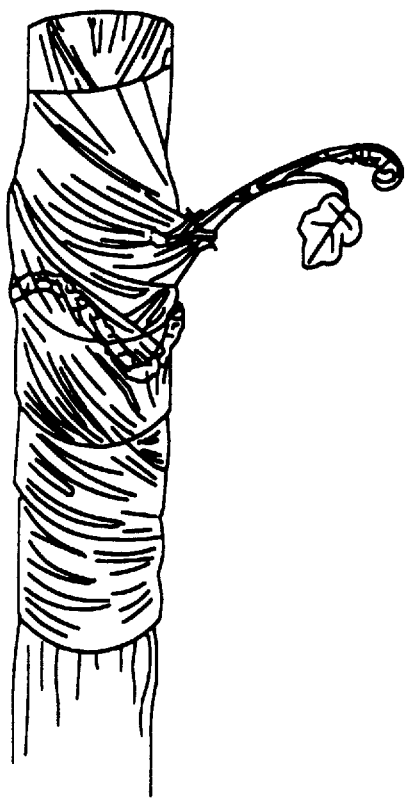

FIGS. 9–11 illustrate the emergence of a bud 26 formed by the graft through the grafting film 22. FIG. 9 illustrates a bud 26 developing beneath the grafting film 22. FIG. 10 illustrates the tip of the bud 26 piercing through the grafting film 26. FIG. 11 illustrates the growth of the bud 26 through the grafting film. As illustrated by FIGS. 9–11, the grafting film 20 should be sufficiently thin and elastic to allow a bud 26 to develop under the grafting film 22 and ultimately break through the grafting film 22. The grafting film should also be sufficiently thin and elastic to allow the bud and scion to grow without being restricted by the grafting film, thereby avoiding the need to remove the grafting tape after callous formation. In order to accomplish these objectives, the grafting film preferably has a thickness of less than about 60 μm, more preferably less than about 50 μm although thinner films may be used. The thickness of the film is preferably between about 40–60 μm and more preferably between about 40–50 μm.

Figure 12B:
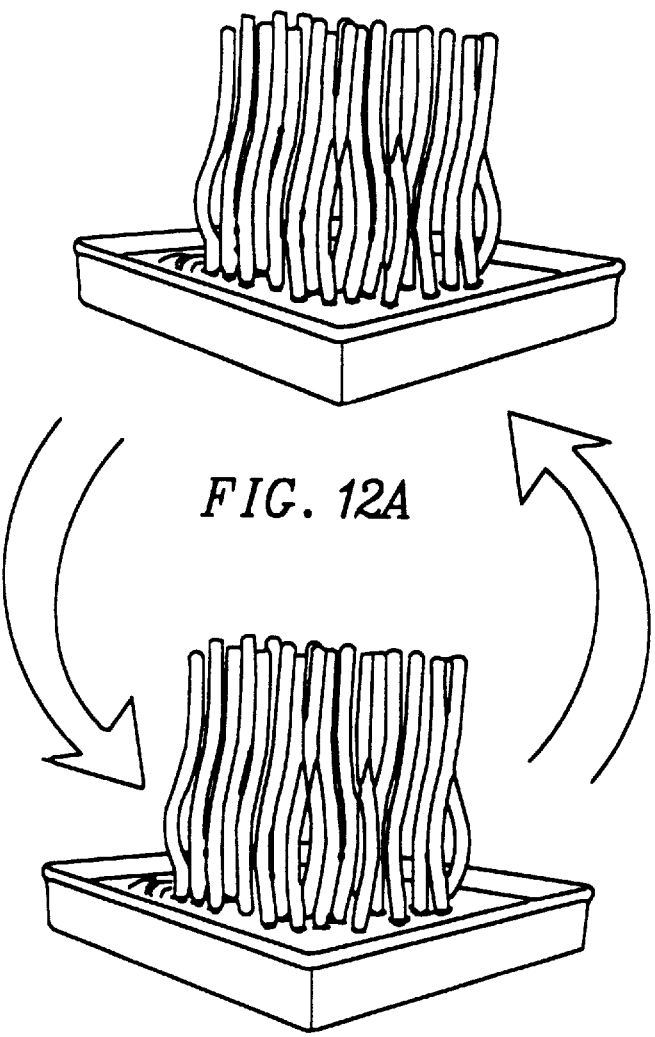

FIGS. 12A and 12B illustrate a preferred method for growing root buds on grafted plants. As illustrated in FIG. 12A, the grafted plants 44 are placed in water for a first period of time. The water should be sufficiently deep to cover the root buds to be formed. During this time, the plants are preferably held in a vertical position. As illustrated in FIG. 12A, bathing the plants in water may be accomplished by placing the plants in a water bath. For grapevine rootstock, the water level in the bath is preferably about 2 inches deep. The air temperature during this first period of time when the plants are being bathed is preferably between about 23° C. and 32° C. with a relative humidity of between about 65% to 95%. The water temperature is preferably within about 5° C. of the air temperature.

As illustrated in FIG. 12B, the grafted plants 44 are removed from the water after the first period of time for a second period of time. This may be achieved by removing the plants from the water bath or, more preferably, by removing the water from the water bath 46.

The timing for placing the plants into and out of the water varies depending on the particular plant variety. For grapevines, plants are commonly placed in water for about 6 hours and removed from the water for about 18 hours. During the time that the plants are not in water, the plants are preferably held in a vertical position. The air temperature during this second period of time is preferably between about 23° C. and 32° C. and has a relative humidity of 65% to 95%.

As illustrated in FIGS. 12A and 12B, after a cycle of placing the plants into water and removing the plants from water, the cycle is repeated until the desired level of root bud growth is observed. Water used in a previous cycle is preferably removed and new, fresh water is preferably added to the bath before each new period of placing the plants into water. It is believed that the plants secrete one or more agents into the water, the accumulation of which can impede growth of the root buds. By using fresh water during each period of time that the plant is bathed in the water, the accumulation of agents which can impede growth of the root buds is avoided.

During the final cycle that the plant is bathed in water, a 2% indole butyric acid solution (IBA) is preferably added to the water.

While the present invention is disclosed by reference to the preferred embodiments and examples detailed above, it is to be understood that these examples are intended in an illustrative rather than limiting sense, as it is contemplated that modifications will readily occur to those skilled in the art, which modifications will be within the spirit of the invention and the scope of the appended claims.

What is claimed is:

1. A grafting film comprising:
   a light transmissive film having length, width and thickness dimensions adapted for using the film to graft a scion to a rootstock by wrapping the film around a scion and rootstock graft union, the film being formed of a polyalkylene polymer having a self-adhesive property and an elastic memory which causes the film when stretched around a scion and rootstock graft union to gradually contract around the graft union and apply an increasing amount of pressure circumferentially around the graft union, the film also having oxygen and $CO_2$ permeability properties which cause a gas volume isolated by the film adjacent the graft union to have a higher $CO_2$ concentration and a lower oxygen concentration relative to an ambient environment.

2. The film according to claim 1 wherein the film has at least 12% oxygen permeability.

3. The film according to claim 1 wherein the film has less than 3% $CO_2$ retention.

4. The film according to claim 3 wherein the film has at least 12% oxygen permeability.

5. The film according to claim 1 wherein the film has a thickness of less than about 60 μm.

6. The film according to claim 1 wherein the film has a thickness of less than about 50 μm.

7. The film according to claim 1 wherein the polyalkylene polymer film is formed of olefin subunits having between 1 and 6 carbons.

8. The film according to claim 1 wherein the polyalkylene polymer is formed of olefin subunits selected from the group consisting of ethylene, propylene, isopropylene, butylene and isobutylene.

9. The film according to claim 1 wherein the polyalkylene polymer film is selected from the group consisting of polyethylene, polyisopropylene, polybutylene and polyisobutylene.

10. The film according to claim 1 wherein the polyalkylene polymer has a specific gravity between about 0.91 and 0.97.

11. The film according to claim 1 wherein the film is at least 50% light transmissive.

12. The film according to claim 1 wherein the film is at least 95% light transmissive.

13. The film according to claim 1 wherein the film is colored.

14. The film according to claim 1 wherein the film is blue.

15. A grafting film comprising:
   a film of a polyalkylene polymer having a thickness of less than about 60 μm, a self-adhesive property and an elastic memory which causes the film when stretched around a scion and rootstock graft union to gradually contract around the graft union and apply an increasing amount of pressure circumferentially around the graft union, the film having at least 12% oxygen permeability and less than 3% $CO_2$ retention which cause a gas volume isolated by the film adjacent the graft union to have a higher $CO_2$ concentration and a lower oxygen concentration relative to an ambient environment.

16. The film according to claim 15 wherein the polyalkylene polymer is formed of olefin subunits selected from the group consisting of ethylene, propylene, isopropylene, butylene and isobutylene.

17. The film according to claim 15 wherein the polyalkylene polymer film is selected from the group consisting of polyethylene, polyisopropylene, polybutylene and polyisobutylene.

18. A method for forming a plant by grafting a scion to a rootstock comprising:

cutting an end of the scion and an end of the rootstock to be grafted;

joining the scion and rootstock ends to form a graft union; and stretching a film of a polyalkylene polymer having a self-adhesive property and an elastic memory around the graft union, the elastic memory causing the film to gradually contract around the graft union and apply an increasing amount of pressure circumferentially around the graft union, the film having oxygen and $CO_2$ permeability properties which cause a gas volume isolated by the film adjacent the graft union to have a higher $CO_2$ concentration and a lower oxygen concentration relative to an ambient environment.

19. The method according to claim 18 wherein the film has at least 12% oxygen permeability.

20. The method according to claim 18 wherein the film has less than 3% $CO_2$ retention.

21. The method according to claim 20 wherein the film has at least 12% oxygen permeability.

22. The method according to claim 18 wherein the film has a thickness of less than about 60 µm.

23. The method according to claim 18 wherein the film has a thickness of less than about 50 µm.

24. The method according to claim 18 wherein the polyalkylene polymer film is formed of olefin subunits having between 1 and 6 carbons.

25. The method according to claim 18 wherein the polyalkylene polymer is formed of olefin subunits selected from the group consisting of ethylene, propylene, isopropylene, butylene and isobutylene.

26. The method according to claim 18 wherein the polyalkylene polymer film is selected from the group consisting of polyethylene, polyisopropylene, polybutylene and polyisobutylene.

27. The method according to claim 18 wherein the polyalkylene polymer has a specific gravity between about 0.91 and 0.97.

28. The method according to claim 18 wherein the film is at least 50% light transmissive.

29. The method according to claim 18 wherein the film is at least 95% light transmissive.

30. The method according to claim 18 wherein the film is colored.

31. The method according to claim 18 wherein the scion is from the prunus or citrus family of plants.

32. The method according to claim 18 wherein the scion is from the grapevine family of plants.

33. A plant formed by grafting a scion to a rootstock in which the scion and rootstock are joined together to form a graft union by stretching a film of a polyalkylene polymer having a self-adhesive property and an elastic memory around the graft union, the elastic memory causing the film to gradually contract around the graft union and apply an increasing amount of pressure circumferentially around the graft union, the film having oxygen and $CO_2$ permeability properties which cause a gas volume isolated by the film adjacent the graft union to have a higher $CO_2$ concentration and a lower oxygen concentration relative to an ambient environment.

34. The plant according to claim 33 wherein the film has at least 12% oxygen permeability.

35. The plant according to claim 33 wherein the film has less than 3% $CO_2$ retention.

36. The plant according to claim 35 wherein the film has at least 12% oxygen permeability.

37. The plant according to claim 33 wherein the film has a thickness of less than about 60 µm.

38. The plant according to claim 33 wherein the film has a thickness of less than about 50 µm.

39. The plant according to claim 33 wherein the polyalkylene polymer film is formed of olefin subunits having between 1 and 6 carbons.

40. The plant according to claim 33 wherein the polyalkylene polymer is formed of olefin subunits selected from the group consisting of ethylene, propylene, isopropylene, butylene and isobutylene.

41. The plant according to claim 33 wherein the polyalkylene polymer film is selected from the group consisting of polyethylene, polyisopropylene, polybutylene and polyisobutylene.

42. The plant according to claim 33 wherein the polyalkylene polymer has a specific gravity between about 0.91 and 0.97.

43. The plant according to claim 33 wherein the scion is from the prunus or citrus family of plants.

44. The plant according to claim 33 wherein the scion is from the grapevine family of plants.

* * * * *